(12) United States Patent
Misak

(10) Patent No.: US 10,661,381 B2
(45) Date of Patent: May 26, 2020

(54) STRUCTURE AND METHOD OF MAKING SAME INVOLVING WELDING OTHERWISE NON-WELDABLE MATERIALS

(71) Applicant: SPIRIT AEROSYSTEMS, INC., Wichita, KS (US)

(72) Inventor: Heath Edward Misak, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 542 days.

(21) Appl. No.: 15/442,295

(22) Filed: Feb. 24, 2017

(65) Prior Publication Data

US 2018/0243860 A1 Aug. 30, 2018

(51) Int. Cl.
*B23K 20/233* (2006.01)
*F16B 5/08* (2006.01)
(Continued)

(52) U.S. Cl.
CPC .......... *B23K 20/2336* (2013.01); *B23K 9/232* (2013.01); *B23K 20/06* (2013.01);
(Continued)

(58) Field of Classification Search
CPC ........ B23K 9/232; B23K 20/06; B23K 20/10; B23K 20/122; B23K 20/2333;
(Continued)

(56) References Cited

U.S. PATENT DOCUMENTS 5,183,991 A * 2/1993 Arai ................. B23K 26/323
219/121.64
5,343,014 A * 8/1994 Ogino ............... B23K 26/323
219/121.64
(Continued)

FOREIGN PATENT DOCUMENTS

DE 102010051534 A1 5/2012
DE 102011077458 A1 * 12/2012 .......... B23K 26/323
JP 2009226420 A * 10/2009 .......... B23K 26/323

OTHER PUBLICATIONS

European Search Report; dated Jul. 25, 2018 for European Patent Application No. 18158076.2; and all references cited therein.
(Continued)

*Primary Examiner* — John Skroupa
(74) *Attorney, Agent, or Firm* — Hovey Williams LLP

(57) ABSTRACT

A structure and a method of creating the structure in which relatively thin pieces of non-weldable aluminum alloy or other non-weldable material are welded together. First layers of a weldable material, such as a weldable aluminum alloy or other weldable material, having a total thickness of between 0.01 and 0.30 inches, are built up on a surface of the first piece using an ultrasonic or other solid state joining technique, and second layers of the weldable material having a similar total thickness are built up on a surface of the second piece using the same technique. The first piece is then welded to the second piece at the first and second layers of weldable material using a fusion welding technique. The resulting structure may be part of an aircraft, landcraft, (Continued)

watercraft, or spacecraft type of vehicle or may be used in other high-performance applications.

20 Claims, 3 Drawing Sheets

(51) Int. Cl.
*B23K 20/10* (2006.01)
*B23K 20/12* (2006.01)
*B23K 26/323* (2014.01)
*B23K 9/23* (2006.01)
*B23K 20/06* (2006.01)
*B23K 31/02* (2006.01)
*B64F 5/00* (2017.01)
*B23K 101/00* (2006.01)
*B23K 103/20* (2006.01)
*B23K 103/18* (2006.01)
*B23K 103/10* (2006.01)
*B23K 101/34* (2006.01)
*B23K 103/16* (2006.01)

(52) U.S. Cl.
CPC ............ *B23K 20/10* (2013.01); *B23K 20/122* (2013.01); *B23K 20/2333* (2013.01); *B23K 26/323* (2015.10); *B23K 31/02* (2013.01); *B64F 5/00* (2013.01); *B23K 2101/006* (2018.08); *B23K 2101/34* (2018.08); *B23K 2103/10* (2018.08); *B23K 2103/166* (2018.08); *B23K 2103/18* (2018.08); *B23K 2103/20* (2018.08)

(58) Field of Classification Search
CPC .............. B23K 20/2336; B23K 26/323; B23K 2101/006; B23K 2101/34; B23K 2103/166; B23K 2103/18; B23K 2103/20; F16B 5/08; Y10T 403/477; Y10T 403/478; Y10T 403/479
USPC .......................................... 403/270, 271, 272
See application file for complete search history.

(56) References Cited

U.S. PATENT DOCUMENTS

| 5,618,452 | A | * | 4/1997 | Matubara | ............ | B23K 26/323 219/121.63 |
| 7,686,205 | B2 | * | 3/2010 | Okamoto | ........... | B23K 20/2333 228/122.1 |
| 8,413,878 | B2 | | 4/2013 | Hackius et al. | | |
| 9,586,282 | B2 | * | 3/2017 | Yang | .................... | B23K 9/0026 |
| 9,969,654 | B2 | * | 5/2018 | Fisk | ........................ | B23K 20/16 |
| 10,155,285 | B2 | * | 12/2018 | Fujiwara | ................ | B23K 26/322 |
| 10,195,689 | B2 | * | 2/2019 | Yang | .................... | B23K 26/322 |
| 2007/0015671 | A1 | * | 1/2007 | Naumovski | .......... | C10M 169/04 508/150 |
| 2018/0141158 | A1 | * | 5/2018 | Yang | .................... | B23K 26/244 |

OTHER PUBLICATIONS

Paul, Kah et al.; "Process Possibility of Welding Thin Aluminum Alloys"; International Journal of Mechanical and Materials Engineering, vol. 7 (2012), No. 3, Feb. 1, 2012, pp. 232-242 (entire document).

Eritt J.; "Laserstrahlschweissen Hochfester Aluminumlegierungen Im Flugzeugbau"; VDI Z, Springer VDI Verlag, DE; vol. 137, No. 6, Jun. 1, 1995; pp. 34-38 (entire document).

* cited by examiner

STRUCTURE AND METHOD OF MAKING SAME INVOLVING WELDING OTHERWISE NON-WELDABLE MATERIALS

FIELD

The present invention relates to structures and methods of creating structures in which pieces of otherwise non-weldable materials are welded together, and more particularly, embodiments concern a structure and a method of creating the structure in which layers of a weldable material are built up on the surfaces of relatively thin pieces of non-weldable material using a solid state joining technique, and then the pieces are welded together at the layers of weldable material using a fusion welding technique.

BACKGROUND

In the manufacture of aircraft fuselages it is sometimes desirable to join together relatively thin components of non-weldable materials, such as joining non-weldable metal stringers to non-weldable skin. 2XXX aluminum alloys are used in the aircraft industry for their high tolerance to damage, and 7XXX and/or aluminum-lithium alloys are used for their high strength. Currently, joining 2XXX to 2XXX, 2XXX to 7XXX, or 7XXX to 7XXX alloys requires riveting them together, which takes time, adds weight, can cause surface deformities and other defects, and reduces performance in compression.

There are a limited number of techniques for joining non-weldable aluminum alloys, but most such techniques produce a material with varying properties. Ultrasonic joining can produce a near-zero metallurgical effect, and can join continuously, but is only suitable for joining thin (<0.04 inches) sheets. Further, ultrasonic joining produces a gnarled surface which can lead to stress concentrators. Linear friction and friction stir joining can produce a reduced or even near-zero metallurgical effect, but are limited to batch-type processes and relatively stiff materials. Magnetic pulse joining can produce a near-zero metallurgical effect, but is also limited to batch-type processes and is not as technology-ready as ultrasonic joining. Explosive joining can produce too much heat for use with relatively thin pieces used in many applications (e.g., components of aircraft fuselages). All of these are considered to be solid-state welding techniques.

There are more techniques available for welding weldable aluminum alloys. Arc, plasma, MIG, and TIG welding are conventional techniques for joining weldable aluminum alloys. Laser beam welding is a relatively old technology with new economic capabilities due to reductions in laser costs and improvements in automation. All of these are considered to be fusion-based welding techniques.

This background discussion is intended to provide information related to the present invention which is not necessarily prior art.

SUMMARY

Embodiments of the present invention solve the above-described and other problems and limitations by providing a structure and a method of creating the structure in which layers of a weldable material are built up on the surfaces of pieces of relatively thin non-weldable material using a solid state joining technique, and then the pieces are welded together at the layers of weldable material using a fusion welding technique.

In a first embodiment of the present invention, a method may be provided for joining a first piece of a first non-weldable material to a second piece of a second non-weldable material, wherein the method may broadly comprise the following steps. At least one first layer of a first weldable material may be added to a first surface of the first piece using a solid state joining technique. At least one second layer of a second weldable material may be added to a second surface of the second piece using the solid state joining technique. The first piece may then be welded to the second piece at the first and second layers of the first and second weldable materials using a fusion welding technique.

Various implementations of the first embodiment may further comprise any one or more of the following features. At least one of the first and second pieces may have a thickness of between 0.01 and 0.25 inches. The first non-weldable material may be a first non-weldable aluminum alloy, the second non-weldable material may be the same or a different second non-weldable aluminum alloy. The first weldable material may be the same type of weldable material as the second weldable material. The solid state joining technique may be an ultrasonic joining technique, a magnetic pulse joining technique, or a friction stir joining technique. The first and second layers of the weldable material may each have a total thickness of between 0.01 and 0.30 inches, or between 0.06 and 0.25 inches. The first and second pieces may be components of a vehicle such as an aircraft, a landcraft, a watercraft, or a spacecraft, and the first piece may be a skin of the vehicle.

In a second embodiment of the present invention, a vehicle structure may broadly comprise a first component made of non-weldable material welded to a second component made of non-weldable material. The first component may be made of a first non-weldable material to which may be added at least one first layer of a first weldable material using a solid state joining technique. The second component may be made of a second non-weldable material to which may be added at least one second layer of a second weldable material using the solid state joining technique. The first and second components may then be welded together at the first and second layers of the first and second weldable materials using a fusion welding technique.

Various implementations of the second embodiment may further comprise any one or more of the following features. The vehicle structure may be part of a vehicle such as an aircraft, a landcraft, a watercraft, or a spacecraft, and the first component may be a skin of the vehicle. At least one of the first and second components may have a thickness of between 0.01 and 0.25 inches. The first non-weldable material may be a first non-weldable aluminum alloy, the second non-weldable material may be the same or a different second non-weldable aluminum alloy. The first weldable material may be the same type of weldable material as the second weldable material. The solid state joining technique may be an ultrasonic joining technique, a magnetic pulse joining technique, or a friction stir joining technique. The first and second pluralities of layers of the weldable material may each have a total thickness of between 0.01 and 0.30 inches, or between 0.06 and 0.25 inches.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
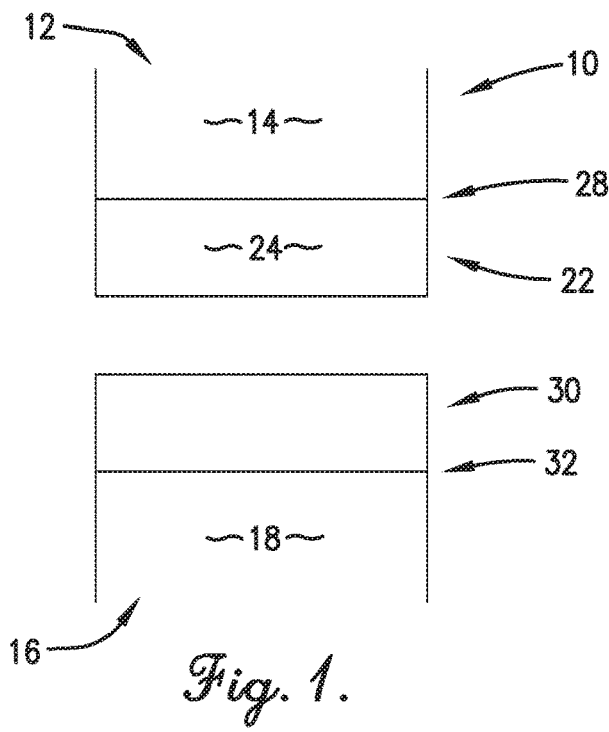
FIG. 1 is an exploded, fragmentary, cross-sectional elevation view of a structure constructed in accordance with an embodiment of the present invention.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments of the present invention provide a structure and a method of creating the structure in which layers of a weldable material are built up on the surfaces of relatively thin pieces of non-weldable material using a solid state joining technique that has limited metallurgical effect, and then the pieces are welded together at the layers of weldable material using a fusion welding technique. Suitable solid state joining techniques do not involve melting the materials to be joined, and may include ultrasonic, magnetic pulse, and friction stir joining techniques. These embodiments provide a real world technical solution to problems in the art of manufacturing vehicle and other structures having characteristics which are not possible to achieve with prior art methods. In particular, it will be appreciated that embodiments provide significant advantages over riveting, including being quicker and more amenable to automation and minimizing defects (which is particularly desirable and advantageous in the manufacture of, e.g., aircraft fuselages).

In an exemplary application, embodiments of the present invention may use an additive process to build-up of layers of 6XXX series weldable aluminum on the skin and stringers of a vehicle body or fuselage. Once the layers of weldable aluminum have been built up on both the skin and stringers, the stringers can be positioned and welded to the skin using a fusion welding process. This results in an optimized structure without damaging the high-performance aluminum alloys of the skin and stringers. Although described herein in the exemplary context of manufacturing aircraft fuselages, embodiments of the present invention may be used in other exemplary contexts such as manufacturing vehicle structures for use in aircraft, landcraft, watercraft, or spacecraft types of vehicle, and/or for use in substantially any other application involving joining high performance non-weldable materials.

Figure 2:
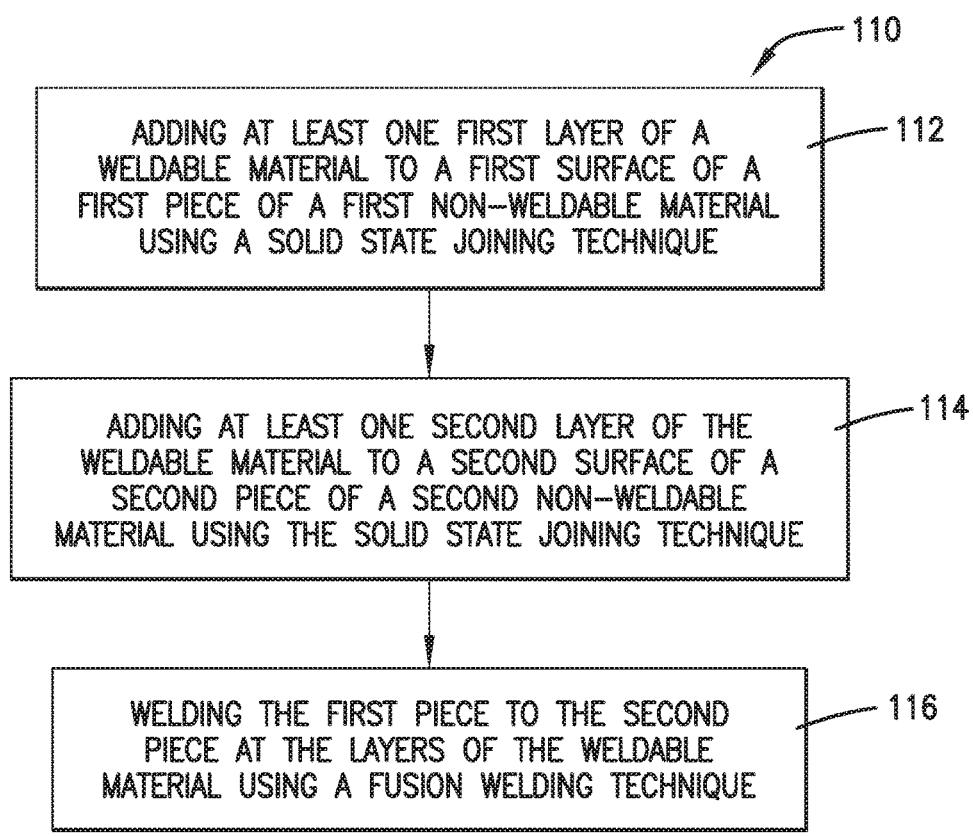
FIG. 2 is a flowchart of steps in a method for constructing the structure of FIG. 1 in accordance with an embodiment of the present invention.

Referring to FIGS. 1 and 2, there is shown an embodiment of a structure 10 and an embodiment of a method 110 of creating the structure 10 in which a first piece 12 of a first non-weldable material 14 is welded to a second piece 16 of a second non-weldable material 18. One or both of the first and second pieces 12,16 may be "relatively thin," i.e., have a thickness of approximately between 0.01 and 0.25 inches, or approximately between 0.05 and 0.20 inches, along its or their smallest dimension(s) relevant to the weld. The first non-weldable material 14 and the second non-weldable material 18 may be the same non-weldable material or different non-weldable materials. For example, the first non-weldable material 14 may be a first non-weldable aluminum alloy and the second non-weldable material 18 may be the same of a different non-weldable aluminum alloy. The method 110 may be employed in the construction of an aircraft, landcraft, watercraft, or spacecraft type of vehicle incorporating the structure 10 comprising the first and second pieces 12,16.

At least one first layer 22 of a weldable material 24 may be added to a first surface 28 of the first piece 12 using a solid state joining technique, as shown in 112. The at least one first layer 22 of the weldable material 24 may have a total thickness of approximately between 0.01 and 0.30 inches, or approximately between 0.06 and 0.25 inches. At least one second layer 30 of the same or a different weldable material 24 may then be added to a second surface 32 of the second piece 16 using the solid state joining technique, as shown in 114. The at least one second layer 30 of the weldable material 24 may have a total thickness of approximately between 0.01 and 0.30 inches, or approximately between 0.06 and 0.25 inches.

In various implementations, the layers 22,30 of weldable material 24 may be shaped or otherwise designed to provide a desired characteristic for subsequent work. For example, each of the layers, or at least the final layer, may be given a shape and/or properties that facilitates the subsequent fusion welding and/or results in a stronger weld. Thus, the layers may have convex, concave, angled, consistent or non-consistent, and/or symmetrical or non-symmetrical cross-sectional shapes and/or properties as needed or desired. The weldable material 24 may be a weldable aluminum alloy. The solid state joining technique may be an ultrasonic, magnetic pulse, or friction stir joining technique.

The first piece 12 may then be welded to the second piece 16 at the first and second layers 22,30 of the weldable material 24 using a fusion welding technique, as shown in 116. If the ultrasonic joining produces a gnarled surface, the subsequent fusion welding may melt and thereby smooth the surface.

Figure 3:
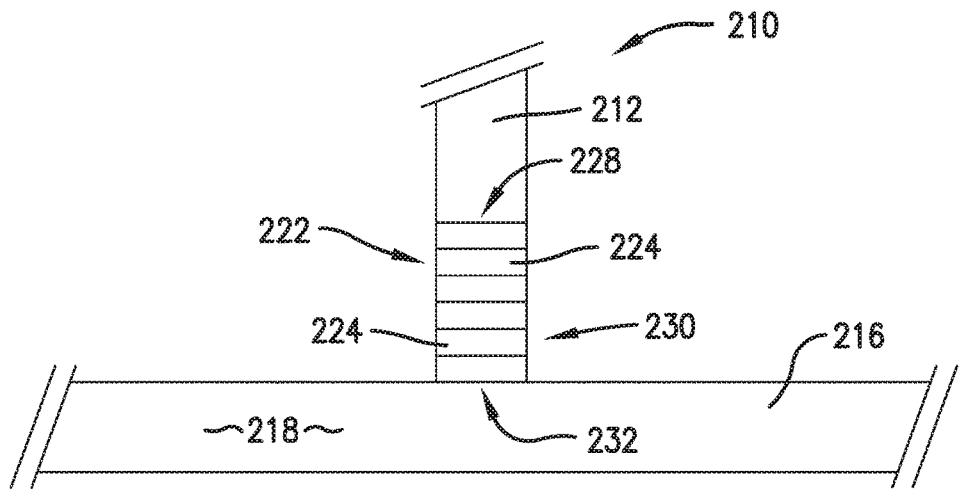
FIG. 3 is an fragmentary, cross-sectional elevation view of a vehicle structure which is an exemplary version of the structure of FIG. 1.
Figure 4:
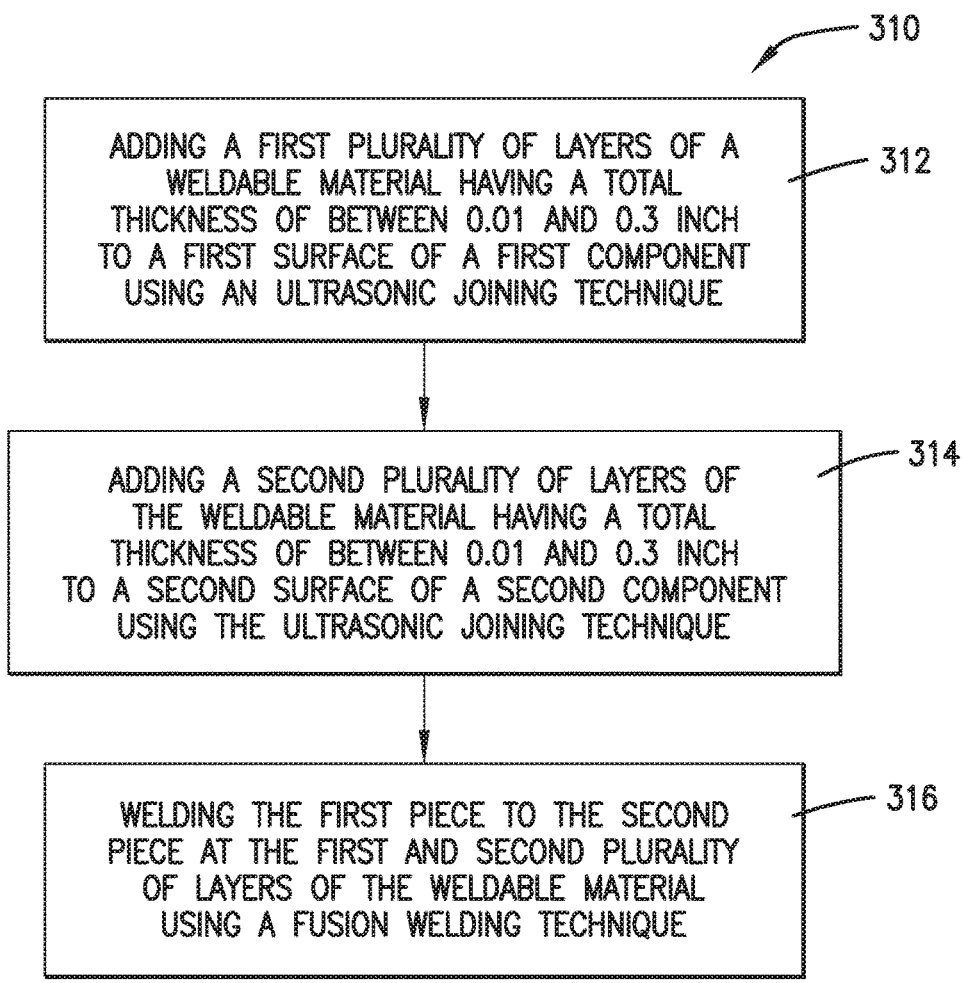
FIG. 4 is a flowchart of steps in a method for constructing the vehicle structure of FIG. 3, wherein the method is an exemplary version of the method of FIG. 2.
Figure 5:
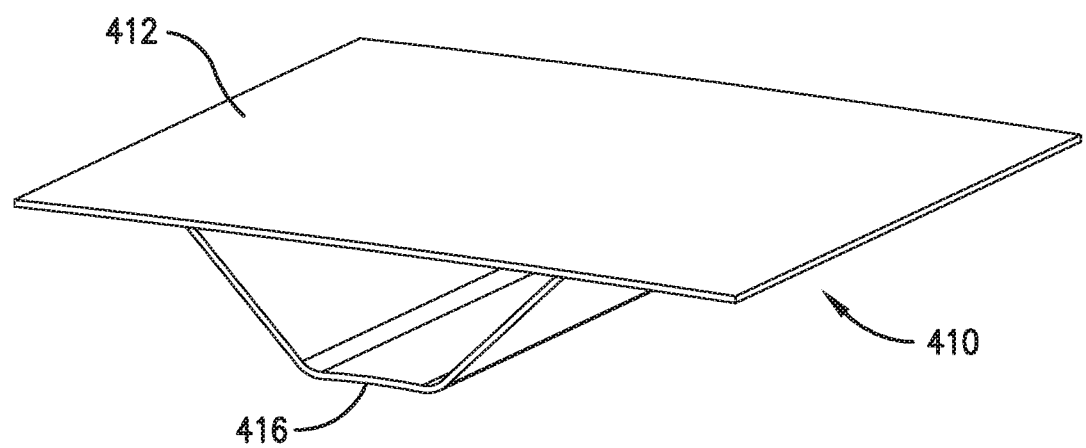
FIG. 5 is an exemplary aircraft structure including a skin and a stringer welded together using the method of FIG. 2 or FIG. 4.

Referring to FIGS. 3 and 4, there is shown an exemplary vehicle structure 210 and an exemplary method 310 of creating the vehicle structure 210 in accordance with embodiments of the present invention in which a first component 212 of a first non-weldable material 214 is welded to a second component 216 of a second non-weldable material 218. In various potential applications, the vehicle structure 210 may be incorporated into an aircraft, landcraft, watercraft, or spacecraft type of vehicle. For example, referring also to FIG. 5, the vehicle structure 310 may be a wing or fuselage of an aircraft, in which first component 312 may be a skin of the aircraft, and the second component 316 may be a stringer supporting the skin.

A first plurality of layers 222 of a weldable material 224 having a total thickness of approximately between 0.01 and 0.30 inches, or approximately between 0.06 and 0.25 inches, may be added to a first surface 228 of the first component 212 using an ultrasonic joining technique, as shown in 312. A second plurality of layers 230 of the same or a different weldable material 224 having a total thickness of approximately between 0.01 and 0.30 inches, or approximately between 0.06 and 0.25 inches, may then be added to a second surface 232 of the second component 216 using the ultrasonic joining technique, as shown in 314. In this example, the non-weldable material 214,218 may be a non-weldable aluminum alloy, and the weldable material may be a weldable aluminum alloy. The first component 212 may then be welded to the second component 216 at the first and second plurality of layers 222,230 of the weldable material 224 using a fusion welding technique, as shown in 316.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of joining a first piece of a first non-weldable material to a second piece of a second non-weldable material, the method comprising
    adding at least one first layer of a first weldable material to a first surface of the first piece using a solid state joining technique;
    adding at least one second layer of a second weldable material to a second surface of the second piece using the solid state joining technique; and
    welding the first piece to the second piece at the first and second layers of the first and second weldable materials using a fusion welding technique.

2. The method as set forth in claim 1, wherein at least one of the first and second pieces has a thickness of between 0.01 and 0.25 inches.

3. The method as set forth in claim 1, wherein the first non-weldable material is a first non-weldable aluminum alloy and the second non-weldable material is a different second non-weldable aluminum alloy.

4. The method as set forth in claim 3, wherein the first weldable material is a same type of weldable material as the second weldable material.

5. The method as set forth in claim 1, wherein the solid state joining technique is selected from the group consisting of: ultrasonic joining techniques, magnetic pulse joining techniques, and friction stir joining techniques.

6. The method as set forth in claim 1, wherein the at least one first and second layers of the weldable material each have a total thickness of between 0.01 and 0.30 inches.

7. The method as set forth in claim 6, wherein the at least one first and second layers of the weldable material each have a total thickness of between 0.06 and 0.25.

8. The method as set forth in claim 1, wherein the first and second pieces are components of a vehicle selected from the group consisting of: aircraft, landcraft, watercraft, and spacecraft, and wherein the first piece is a skin of the vehicle.

9. A method of joining a first piece of a non-weldable aluminum alloy to a second piece of the non-weldable aluminum alloy, wherein the first and second pieces each have a thickness of between 0.01 and 0.25 inches, the method comprising:
    adding a first plurality of layers of a weldable material having a total thickness of between 0.01and 0.30 inches to a surface of the first piece using an ultrasonic joining technique;
    adding a second plurality of layers of the weldable material having a total thickness of between 0. 01 and 0.30 inches to a surface of the second piece using the ultrasonic joining technique; and
    welding the first piece to the second piece at the first and second plurality of layers of the weldable material using a fusion welding technique.

10. The method as set forth in claim 9, wherein the first and second pluralities of layers of the weldable material each have a total thickness of between 0.06 and 0.25.

11. A vehicle structure comprising:
    a first component made of a first non-weldable material to which is added at least one first layer of a first weldable material using a solid state joining technique; and
    a second component made of a second non-weldable material to which is added at least one second layer of a second weldable material using the solid state joining technique,
    wherein the first component and the second component are welded together at the first and second layers of the first and second weldable materials using a fusion welding technique.

12. The vehicle structure as set forth in claim 11, wherein the vehicle structure is part of a vehicle selected from the group consisting of: aircraft, landcraft, watercraft, and spacecraft, and wherein the first component is a skin of the vehicle.

13. The vehicle structure as set forth in claim 11, wherein at least one of the first and second components has a thickness of between 0.01 and 0.25 inches.

14. The vehicle structure as set forth in claim 11, wherein the first non-weldable material is a first non-weldable aluminum alloy and the second non-weldable material is a different second non-weldable aluminum alloy.

15. The vehicle structure as set forth in claim 14, wherein the first weldable material is a same type of weldable material as the second weldable material.

16. The vehicle structure as set forth in claim 11, wherein the solid state joining technique is selected from the group consisting of: ultrasonic joining techniques, magnetic pulse joining techniques, and friction stir joining techniques.

17. The vehicle structure as set forth in claim 11, wherein the at least one first and the at least one second layers of the weldable material each have a total thickness of between 0.01 and 0.30 inches.

18. The vehicle structure as set forth in claim 17, wherein the at least one first and the at least one second layers of the weldable material each have a total thickness of between 0.06 and 0.25 inches.

19. A vehicle structure, wherein the vehicle structure is part of a vehicle selected from the group consisting of: aircraft, landcraft, watercraft, and spacecraft, and the vehicle structure comprising:
    a first component made of a non-weldable aluminum alloy and having a thickness of between 0. 01 and 0.25 inches, and to which is added a first plurality of layers of a weldable material having a total thickness of between 0.01 and 0.30 inches using an ultrasonic joining technique, wherein the first component is a skin of the vehicle; and a second component made of a non-weldable aluminum alloy and having a thickness of between 0. 01 and 0.25 inches, and to which is added a second plurality of layers of the weldable material having a total thickness of between 0.01 and 0.30 inches using the solid state joining technique, wherein the first component and the second component are welded together at the first and second plurality of layers of the weldable material using a fusion welding technique.

20. The vehicle structure as set forth in claim 19, wherein the first and second pluralities of layers of the weldable material each have a total thickness of between 0.06 and 0.25inches.

\* \* \* \* \*